United States Patent [19]

Maiocco

[11] 4,334,248
[45] Jun. 8, 1982

[54] VERBAL TRAVEL INSTRUCTION SYSTEMS AND METHOD

[76] Inventor: Nicholas P. Maiocco, 58 Plankton St., Bridgeport, Conn. 06606

[21] Appl. No.: 122,630

[22] Filed: Feb. 19, 1980

[51] Int. Cl.³ .............................................. G11B 5/00
[52] U.S. Cl. ...................................................... 360/12
[58] Field of Search ......................................... 360/12

[56] References Cited

U.S. PATENT DOCUMENTS

| | | | |
|---|---|---|---|
| 3,575,575 | 4/1971 | Kean | 360/12 |
| 3,596,010 | 7/1971 | Patterson | 360/12 |
| 3,647,991 | 3/1972 | Gaon et al. | 360/12 |
| 4,030,127 | 6/1977 | Newman | 360/12 |
| 4,159,490 | 6/1979 | Wood | 360/12 |
| 4,190,819 | 2/1980 | Burgyan | 360/12 |

FOREIGN PATENT DOCUMENTS 1395333  5/1975  United Kingdom .................. 360/12

Primary Examiner—Vincent P. Canney
Attorney, Agent, or Firm—Thomas L. Tully

[57] ABSTRACT

System for pre-recording a series of travel instructions, each comprising a verbal direction segment and a sound signal representative of a mileage location along the travel route, onto a magnetic recording medium and for synchronizing the intermittent play-back of said recording medium with an automobile odometer and a play-back device to intermittently activate the play-back device for brief time periods at predetermined mileage distances signalled by the odometer, corresponding to the mileage location sound signals on the recording medium.

5 Claims, 3 Drawing Figures

VERBAL TRAVEL INSTRUCTION SYSTEMS AND METHOD

The present invention relates to a novel and practical systems for pre-recording a series of travel instructions on a magnetic recording medium such as a tape and for automatically playing back appropriate segments of said instructions at predetermined mileage locations along the route being travelled, each of said instruction segments providing information pertinent to the location of the driver along the route.

This invention is an improvement over prior-known systems for providing the same results, i.e., for recording travel instructions relating to directions to be followed at variable mileage positions along a travel route, and for playing back the recorded instructions at the appropriate locations along the travel route. One prior system for accomplishing this result requires that a message be taped at regular distance intervals, i.e., each kilometer travelled—see U.S. Pat. No. 3,711,653. Such system is unsatisfactory, since it does not provide separate directions at each location within said regular intervals and it requires the use of recording tape between long distance intervals where no specific directions are required. Other known systems employ a synchronizing tape provided with variably spaced perforations, corresponding to distance travelled, for activating a tape playback device to provide verbal instructions at predetermined locations along a travel route—see U.S. Pat. Nos. 2,669,457 and 2,501,048. Such synchronizing tapes require their own mounting, transport and sensing systems, separate from the mounting, transport and sensing systems of the recording tape, thereby increasing the space required within the vehicle and the number of components subject to failure. Another system proposed by U.S. Pat. No. 2,928,186 provides a number of mileage dials which are pre-set to activate a recorded tape message pertinent to said mileage position along a travel route. Such system is limited to a number of taped messages no greater than the number of dials provided.

SUMMARY OF THE INVENTION

The novel system of the present invention represents a simplification of prior-known systems which makes it entirely practical to incorporate the present invention into modern automobiles which include tape deck devices. The present system enables the user to pre-record on a conventional magnetic recording tape or disc a series of verbal instructions or advice to be followed at variable predetermined locations along a route to be driven, and to also record actuation signals which are representative of predetermined mileage values and which are correlated with signals generated by operation of the automobile odometer to actuate the tape deck or play-back device for a timed period to play back the segment of the recording tape or disc carrying the particular verbal instructions or advice pertinent to the particular mileage locations along the route.

In this manner, the verbal directions are played at the time or immediately before the time that route changes must be made, there is no need to remember a series of route changes at one time and a large number of verbal directions can be recorded on a tape of conventional length.

Thus the novel system of the present invention combines two systems, namely a recording system which is generally separate from the automobile and in which a magnetic recording medium is provided with a series of actuation sound signals representative of miles travelled and with recorded verbal message segments related to said signals, and a play-back system in which a mileage signal means is associated with the automobile odometer and with the play-back device to provide signals representative of miles travelled, said signals being compared with the actuation sound signals emitted by the recording medium to actuate the play-back device for timed periods and play the recorded verbal messages pertinent to the particular mileage locations along the travel route.

BRIEF DESCRIPTION OF THE DRAWING

Referring to FIG. 1, a magnetic tape recorder 10 is used which has its "on" switch 11 connected to a timer 12 controlled by a switch 13 which permits the tape recorder to run for a predetermined timed period, such as 30 seconds. The recorder 10 also has a record terminal 14 which is connected to a microphone 15 to permit verbal direction messages to be recorded while the recorder is on. Also connected to the record terminal 14 is a sound converter 16 and a digital device 17, the latter permitting any combination of number buttons shown thereon to be depressed, corresponding to the number of miles to be travelled before a first recorded message is to be played, the combination of buttons depressed providing a particular pulse signal to the sound converter 16, which converts said pulse signal to a particular sound signal which is recorded on the tape immediately in advance of the recorded message relating to said mileage position.

Referring to FIG. 2, for example, the magnetic recording tape 18 present within the recorder 10, such as within a removable cassette, is divided into a plurality of timed 30-second increments, the length of each being uniform and being controlled by the timer 12 of the recorder. To initiate the recording process, the switch 13 is activated to start the timer 12 and the recorder 10. A brief starting message is dictated through the microphone 15, such as a description of the point of origin and the destination, so that the tape can be identified for future use. Before the 30-second run period has expired, mileage button(s) on the digital device 17 are depressed to indicate the number of miles from origin to be travelled before the first instruction message is to be played back. This causes a first mileage pulse signal to be transmitted to sound converter 16 which emits a first sound signal to the recorder 10 and tape 18. This completes the first 30-second increment of the tape, as indicated by FIG. 2. Successive 30-second increments of the tape are recorded by repeating the above procedure, i.e., activating switch 13, dictating the first verbal direction message pertinent to the first mileage location to be signalled by the first mileage sound signal, previously recorded, and then, before the remainder of the 30-second time period has expired, depressing the digital buttons on device 17, corresponding to the next mileage location from origin at which a second recorded message is to be played, to cause the converter 16 to emit a second, different mileage sound signal to the tape 18. Since each verbal direction-message segment and the sound signal for the following message segment occupies only a 30-second increment of tape, it is clear that a great number of different message segments and sound signals can be recorded on a 30-minute or 60-minute cassette.

Figure 3:
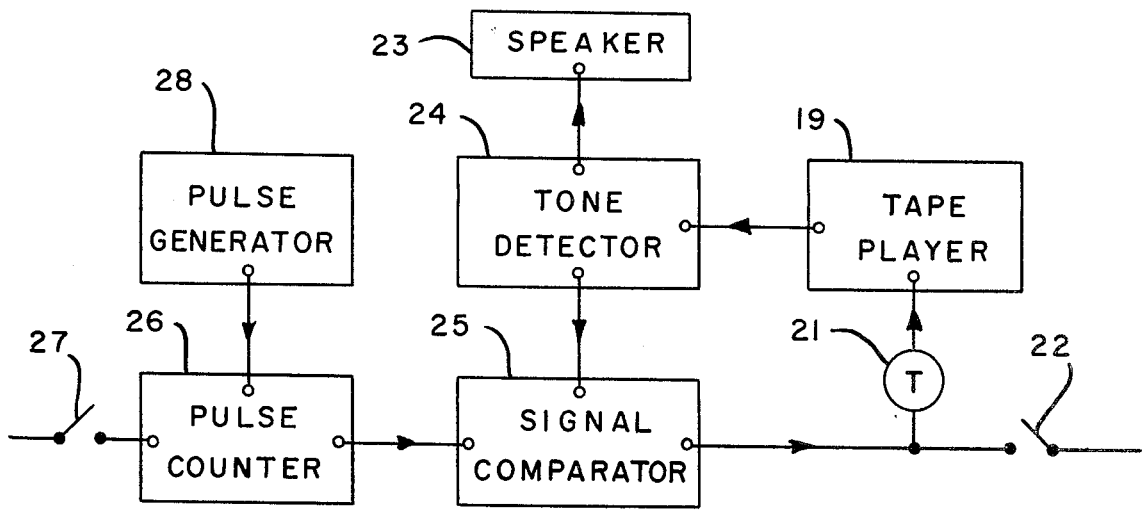
FIG. 3 is a flow diagram illustrating the play-back system of the present invention.

The sound converter 16 and digital device 17 are conventional tone generating modular devices which are commercially-available in association with conventional tone detectors, primarily for use in telecommunications or digital data transmission systems, such as the Bendix-Pacific Electro-span and the I.B.M. Model 130. Digital codes corresponding to the mileage locations are indexed on the digital device 17 by depressing the appropriate buttons, numbered zero through nine. The indexed code causes a pulse signal to be transmitted and converted to an individual tone frequency sound by converter 16, which sound is recorded on the magnetic tape 18 for reproduction and detection by the play-back system illustrated by FIG. 3.

Thus the recorded tape is inserted into a tape player 19 located within the automobile, such as a dash-mounted cassette player. Player 19 has its "on" switch 20 connected to a timer 21 corresponding in duration to the recorder timer 12 of FIG. 1, such as a 30-second timer. Timer 21 is also provided with a manual start switch 22 which enables the play-back system to be put into initial operation, before the vehicle is put into motion, to play the starting message recorded at the beginning of the tape 18 and the first mileage position sound signal before the tape player 19 is deactivated by the expiration of the 30-second timer 21. The first message and position signal are transmitted to a speaker 23 through a conventional tone detector 24 which detects the first mileage position signal and generates a corresponding electrical pulse and transmits it to a comparator 25. Thus the starting message is played back to the driver over the speaker 23 and the first mileage position sound signal is converted to a mileage location pulse which is transmitted to the comparator 25 to set the comparator for emission of an activation signal when a corresponding mileage pulse count is received from counter 26.

The comparator 25 is associated with a pulse counter 26, such as a shift register, having a reset switch 27, counter 26 being connected to a pulse generator 28 which is connected to the automobile odometer and is adapted to transmit regular pulses, such as one pulse per mile, to the counter 26 according to the operation of the odometer.

Before the start of a trip, the reset button 27 is activated to reset the counter 26 to zero. Subsequent movement of the automobile causes pulses to be generated and transmitted to the counter 26 or shift register which, in turn, stores and counts the pulses and emits signals to the comparator 25 indicative of the number of pulses received from the odometer pulse generator 28. These pulse count signals are stored in the comparator until they match the first mileage sound signal, also stored in the comparator, at which time an activation signal is transmitted to the timer 21 to cause the tape player 19 to play for another 30-second period, during which the first direction message segment is played over speaker 23 and the second mileage position sound signal is played, identified by the tone detector 24 and transmitted as a unique signal to the comparator 25 where it is stored for matching with the corresponding odometer pulse count.

Figure 1:
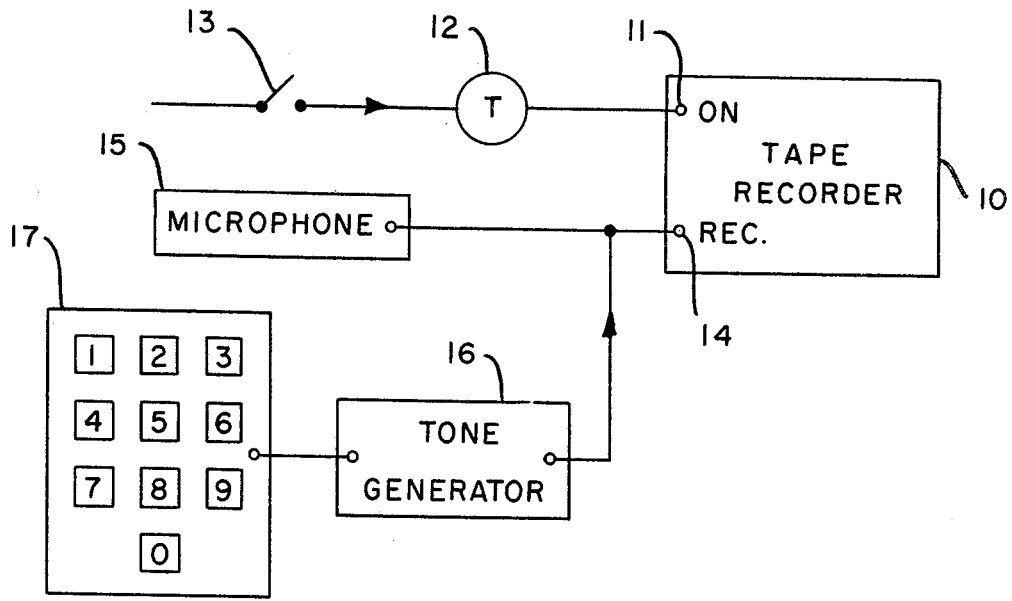
FIG. 1 is a flow diagram illustrating the pre-recording system of the present invention.
Figure 2:
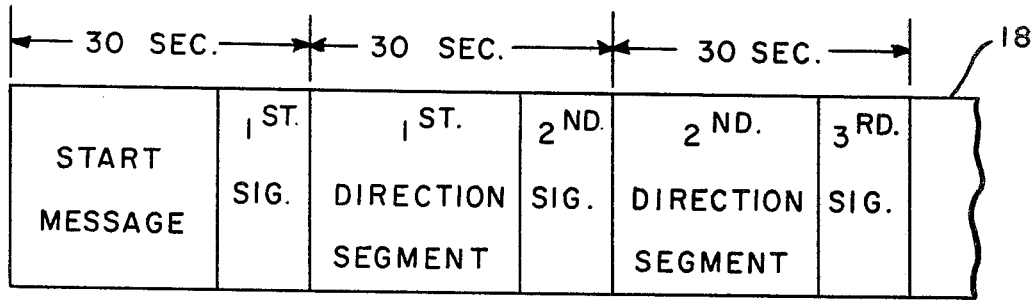
FIG. 2 is a representation of a pre-recorded tape according to the present invention, illustrating the timed recorded message and actuation signal segments of the tape.

The foregoing cycle is repeated for each mileage position signal which is a frequency tone unique to that particular mileage position as indexed on the original digital device 17 of FIG. 1.

If desired, the present system may be integrated into a conventional automobile radio-tape deck combination so that the driver can listen to the radio during the trip, radio sound transmission being interrupted automatically for the brief and intermittent periods of operation of the present tape play-back system.

Variations and modifications will be apparent to those skilled in the art within the scope of the present claims.

I claim:

1. A system for recording and playing back a series of travel instruction messages on a magnetic tape in a tape-recording and play-back device for use in a vehicle having an odometer, each said instruction message comprising a tone signal code representing a distance to be travelled by the vehicle to reach a location, and a verbal direction message pertinent to the operation of the vehicle when it reaches said location, said system comprising a tape-recording and play-back device; digital means associated with said tape-recording and play-back device for recording on said magnetic tape a series of said tone signal codes, each of which is to be played back in advance of a verbal direction message pertinent thereto to form a travel instruction message; means associated with said tape-recording and play-back device for recording on said magnetic tape a series of verbal direction messages, each of said direction messages to be recorded subsequent to a pertinent tone signal code; tone detecting and decoding means associated with said tape-recording and play-back device for detecting and decoding each of said tone signal codes to set a comparing means for a travel distance represented by said tone signal code; distance measuring means associated with the odometer of the vehicle and with said comparing means for registering in said comparing means the distance travelled by the vehicle; said comparing means causing activation of said play-back device when the distance travelled by the vehicle corresponds to the travel distance represented by the first tone signal code, whereby the first verbal direction message pertinent to said tone signal code is played back to guide the operator of the vehicle at the pertinent location, and a second tone signal code is played back to reset the comparing means for a second travel distance represented by said second tone signal code.

2. The system according to claim 1 in which each said pre-recorded travel instruction message comprises a said verbal direction segment and a said mileage location sound signal corresponding to the mileage location to which the verbal direction segment of the following travel instruction message pertains.

3. The system according to claims 1 or 2 in which each said pre-recorded travel instruction message has an identical play-back time, and timer means are associated with said player means to limit the duration of activation of said player means to said play-back time.

4. The system according to claim 1 in which said play-back device is also provided with a manual start switch to initiate play-back of the first pre-recorded travel instruction message before the vehicle is placed into motion along said travel route.

5. The system according to claim 1 in which said distance measuring means comprises a pulse-generating means associated with the odometer of the vehicle for generating pulses representative of the distance travelled by the vehicle, and a pulse-storing means associated with the comparing means for providing thereto signals representative of the number of pulses received from said pulse-generating means.

* * * * *